United States Patent [19]

Dietel

[11] Patent Number: 4,945,638

[45] Date of Patent: Aug. 7, 1990

[54] HEDGE CUTTING, TRIMMING AND PRUNING TOOL

[76] Inventor: Glenn Dietel, 305 Thistle La., Maitland, Fla. 32751

[21] Appl. No.: 225,026

[22] Filed: Jul. 27, 1988

[51] Int. Cl.⁵ .............................................. B26B 3/00
[52] U.S. Cl. ...................................... 30/309; 30/318; 30/356; 30/344
[58] Field of Search ................ 30/309, 318, 339, 344, 30/356

[56] References Cited

U.S. PATENT DOCUMENTS

| | | | |
|---|---|---|---|
| 898,535 | 9/1908 | Volckmann | 30/309 |
| 1,617,004 | 2/1927 | Allen | 30/309 |
| 2,312,133 | 2/1943 | Thompson | 30/318 |
| 2,520,463 | 8/1950 | Hubner | 30/309 X |
| 2,753,632 | 7/1956 | Varn | 30/356 X |

FOREIGN PATENT DOCUMENTS 635429 9/1936 Fed. Rep. of Germany ........ 30/309

Primary Examiner—Frank T. Yost
Assistant Examiner—Willmon Fridie, Jr.
Attorney, Agent, or Firm—Edward M. Livingston

[57] ABSTRACT

A tool for manually cutting, trimming and pruning hedges and the like. This cutting tool has a semi-circular curved blade, with a cutting surface on the inner side thereof, said blade being attached to a handle by wing nuts and bolts or other fastening means. This cutting tool makes vertical cuts by the user standing at right angles to a hedge and swinging downward on the side of the hedge. Horizontal cuts are made by the user swinging the tool from right to left, or vice versa, on top of the hedge. The curved blade is designed to increase and concentrate the cutting power of the tool. The handle is offset from the blade for safety purposes to keep the user's legs and feet outside the line of the swinging arc so that the legs and feet are not cut. The offset handle further keeps the hands from being scratched by the side of the hedge. This new lightweight cutting tool is less tiring to use than normal pruning shears and accomplishes hedge cutting so quickly and effectively that it makes the use and purchase of expensive electric and gas-powered hedge trimmers unnecessary.

2 Claims, 1 Drawing Sheet

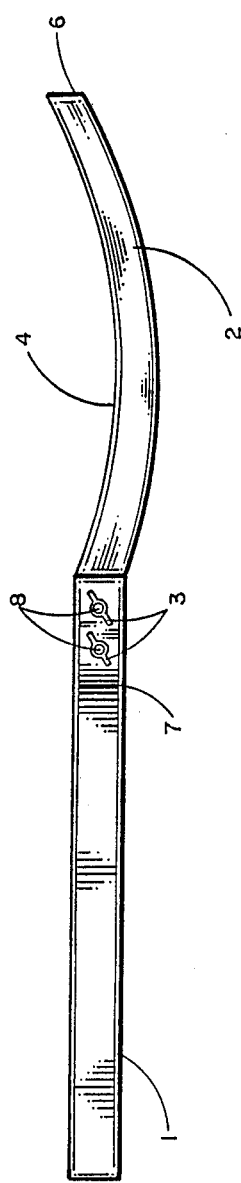
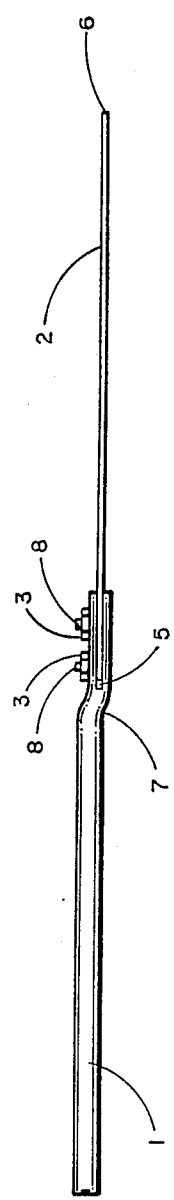

HEDGE CUTTING, TRIMMING AND PRUNING TOOL

BACKGROUND OF THE INVENTION

This invention relates to cutting implements, and more particularly to a manual cutting tool used to cut, trim and prune hedges and the like.

Most commonly, hedges and shrubbery must be cut by electrically or gas-powered clippers for effective trimming. This can be expensive, especially for homeowners who must purchase such powered clippers. If one chooses to do it manually, the only tools available are pruning or scissor shears, the use of which is very time-consuming and physically exhausting. Thus, a need exists for an effective and inexpensive manual cutting tool which can be used by homeowners to cut, trim and prune hedges, shrubbery and even small bushes and trees.

The prior art contains some cutting implements which attempt to fill the need for an effective manual cutting tool, but none do it effectively and in the same manner as does the instant invention. For instance, U.S. Pat. No. 2,513,663 by McDaniel (1950) shows a cutting implement with a straight handle and semi-circular sideways curved blade. U.S. Pat. No. 4,387,510 by Hashemiford (1983) also shows a cutting tool with a straight handle and an end which is curved downward. U.S. Pat. No. 1,387,246 by Earle (1921) discloses a cutting tool which is designed to cut grass and has a straight handle with a curved leg. Brit. Pat. No. 584,192 (1947) shows a grass cutting tool with a straight handle and blade that can be curved outward when used. Brit. Pat. No. 840,558 (1960) discloses a hedge cutting tool with a pair of blades enclosed within a handle. Still another U.S. Pat. No. 2,520,463 by Hubner (1950) shows a grass cutting tool with a straight razor blade for cutting purposes. U.S. Pat. No. 2,969,593 by Sinclair (1980) shows a weed and grass cutting tool with a straight handle and blade that can be curved as needed for cutting. Finally, another U.S. Pat. No. 1,548,513 by Day (1925) shows a sickle with a straight handle and a cutting blade.

The instant invention, unlike the inventions in the prior art, has both a downwardly curved blade and an offset handle secured together by fastening means such a wing nuts and bolts. The invention is lightweight, but at the same time provides great cutting power when swung as the force is concentrated and the hedge is drawn into the cutting portion by the specially curved blade. The offset handle maintains distance between the user and the cutting blade for safety purposes.

SUMMARY OF THE INVENTION

The primary object of this invention is to provide a cutting tool which can be used manually to cut hedges, shrubbery and the like.

A second object of the invention is to provide such a cutting tool which is safe for users.

Another object of the invention is to provide a cutting tool which is designed to increase and concentrate the cutting power of the blade.

Even another object of the invention is to provide a cutting tool which is faster than manual shears and even power hedge cutters.

A further object of the invention is to provide a cutting tool which more effectively and cleanly cuts, trims and prunes hedges and shrubberies.

And still another object of the invention is to provide a cutting tool which is less physically exhausting to the user than other manual hedge cutters.

The instant invention accomplishes the above and other objects by providing a cutting tool which has a handle with blade securely fastened thereto by wing nuts or other fastening means. The handle is offset from the line of the blade so that the user is able to stand at a safe distance away from a hedge when making a vertical cut, to prevent the user's legs and feet from being cut. The increased and concentrated cutting power of the blade is attained due to the curved design of the blade which draws the hedge into rather than away from the cutting line. The tool is less exhausting to the user, not only because it is lightweight, but also because the special design enables it to cut and trim hedges and other shrubbery faster and with fewer strokes than traditional pruning shears.

Other objects, advantages and features of the invention will become readily apparent from the following detailed description of the specific embodiment thereof when read in conjunction with the accompanying drawings.

BRIEF DESCRIPTION OF THE DRAWINGS

The drawings appended to this application are as follows:

FIG. 1 is a top view of the invention; and

FIG. 2 is a side elevational view of the invention.

DETAILED DESCRIPTION OF THE PREFERRED EMBODIMENT

Referring in detail to the drawings, FIGS. 1 and 2 show the invention with a handle 1, which may be made of wood, plastic, or even metal, such as stainless steel, and blade 2, secured together by wing nuts 3 and a bolt (not shown) inserted through the side of the handle 1 at the secured end of the blade 5.

As shown in the drawings, the blade 2 is curved radially from the secured end 5 at the handle 1 to the outer tip 6. The sharp cutting edge 4 is on the bottom inner portion of the blade 2. This curved blade design allows the cutting face to be directed to the center of the cutting edge 4 when the cutting tool is held downward in the vertical direction. This design provides for faster, more effective and cleaner cutting action.

As best shown in FIG. 2, the handle 1 is indented inward and offset at 7 from the blade 6. This offset 7 provides safety by allowing the user to remain away or outside the downward cutting arc so that the feet or legs are away from blade 6. The offset 7 also helps prevent the back of the user's hand from being scratched by the side of the hedge or shrubbery during cutting.

In the preferred embodiment, the blade 2 is secured to the handle 1 by inserting the blade 2 into a slot 5 in the offset portion 7 of the handle 1. Then bolts (not shown) pass through the handle and blade and are secured by tightening wing nuts 3. Securing the blade in this fashion not only provides stability, but also allows the blade 2 to be removed as necessary for sharpening or replacement.

To use the invention for hedge cutting, the user stands at a right angle to the hedge, then makes a downward swing with the invention so that the blade 2 hits the side of the hedge, resulting in a vertical cut. When properly used, repetition of this action will quickly and easily produce a nicely trimmed hedge. For trimming the tops of hedges or shrubbery, when a horizontal cut is desired, the horizontal cut is achieved by swinging the invention from right to left or vice versa. The preferred embodiment of the invention as shown in the drawings is for a right-handed user. For a left-hand user, the offset portion 7 would be indented in the opposite direction as that shown with the cutting surface 4 on the opposite side of the blade 2.

In addition to being used for trimming hedges, the cutting tool, which is the subject of this invention, is excellent for pruning tall shrubs or even small trees which could not normally be reached with common pruning shears.

As described in detail above, it should be apparent that there has been provided a new, useful and nonobvious cutting tool for cutting, trimming and pruning hedges, shrubbery and the like, said cutting tool offering significant advantages over prior patented inventions. The cutting tool has a handle which is offset from the line of the blade for safety purposes so that the user does not cut legs or feet or scratch the back of his hands during use. In addition to a special offset handle, the blade itself is curved so that it increases and concentrates the cutting power of the invention for a faster and more effective cutting job. The device is also lightweight, so overall the job of manually cutting hedges and shrubbery is significantly less exhausting with the use of this invention. Even furthermore, this invention makes manual hedge cutting so easy that it eliminates the need to purchase expensive gas or electrically powered hedge cutters, thereby reducing the expense to consumers.

While a specific embodiment of the invention has been described in detail hereinabove, it is to be understood that various modifications may be made from the specific details described hereinabove without departing from the spirit and scope of the invention as set forth in the appended claims.

Having described in detail my invention, I claim the following:

1. A tool for manually trimming, cutting and pruning hedges and the like comprising:
    an elongated handle having a portion at one end which is offset from the remainder of the handle;
    a blade aligned with and attached to the offset portion of the handle, said blade being semi-circularly shaped and having a cutting surface on the inner edge of the semi-circular blade; and
    fastening means in the offset portion of the handle for attaching the blade to the handle.

2. The tool of claim 1 wherein the fastening means comprises a slot cut into the offset portion of the handle into which the blade is inserted and secured therein by bolts which are passed through the side of the handle on one side of the slot through a hole in the blade and into the side of the handle on the other side of the slot, said bolts protruding from the other side of the handle in order that wing nuts can be tightened thereon.

* * * * *